United States Patent

[11] 3,579,897

| [72] | Inventor | Dean V. Babst |
| | | 31 Linden Road, Ho-Ho-Kus, N.J. 07423 |
| [21] | Appl. No. | 817,524 |
| [22] | Filed | Apr. 18, 1969 |
| [45] | Patented | May 25, 1971 |

[54] FISH-CATCHING APPARATUS WITH SNAP-ACTUATABLE HOOKS
5 Claims, 7 Drawing Figs.

[52] U.S. Cl............................................. 43/35, 43/94
[51] Int. Cl............................................. A01k 83/00
[50] Field of Search........................................ 43/35, 34, 36, 94, 89

[56] References Cited
UNITED STATES PATENTS

| 435,590 | 9/1890 | Saxon.......................... | (43/89UX) |
| 1,160,622 | 11/1915 | Ledyard...................... | 43/94 |
| 2,143,631 | 1/1939 | Nisses-Gagner.............. | 43/35 |

FOREIGN PATENTS

| 458,883 | 8/1949 | Canada........................ | 43/35 |

*Primary Examiner*—Samuel Koren
*Assistant Examiner*—Daniel J. Leach
*Attorney*—Kenyon, Kenyon, Reilly, Carr & Chapin

ABSTRACT: Fish-catching apparatus including a spring mechanism having a pair of spring legs with fish hooks extending toward each other from each of the legs. The spring mechanism biases the legs toward each other and a trigger is fixed relative to one leg and releasably fixable relative to the other leg for holding the legs and hooks apart from each other against the bias of the spring. When a fish bites at the apparatus the fish will strike the trigger moving the trigger from between the spring legs to allow the legs and hooks to move toward each other so the fish biting at the apparatus will be caught on at least one of the hooks.

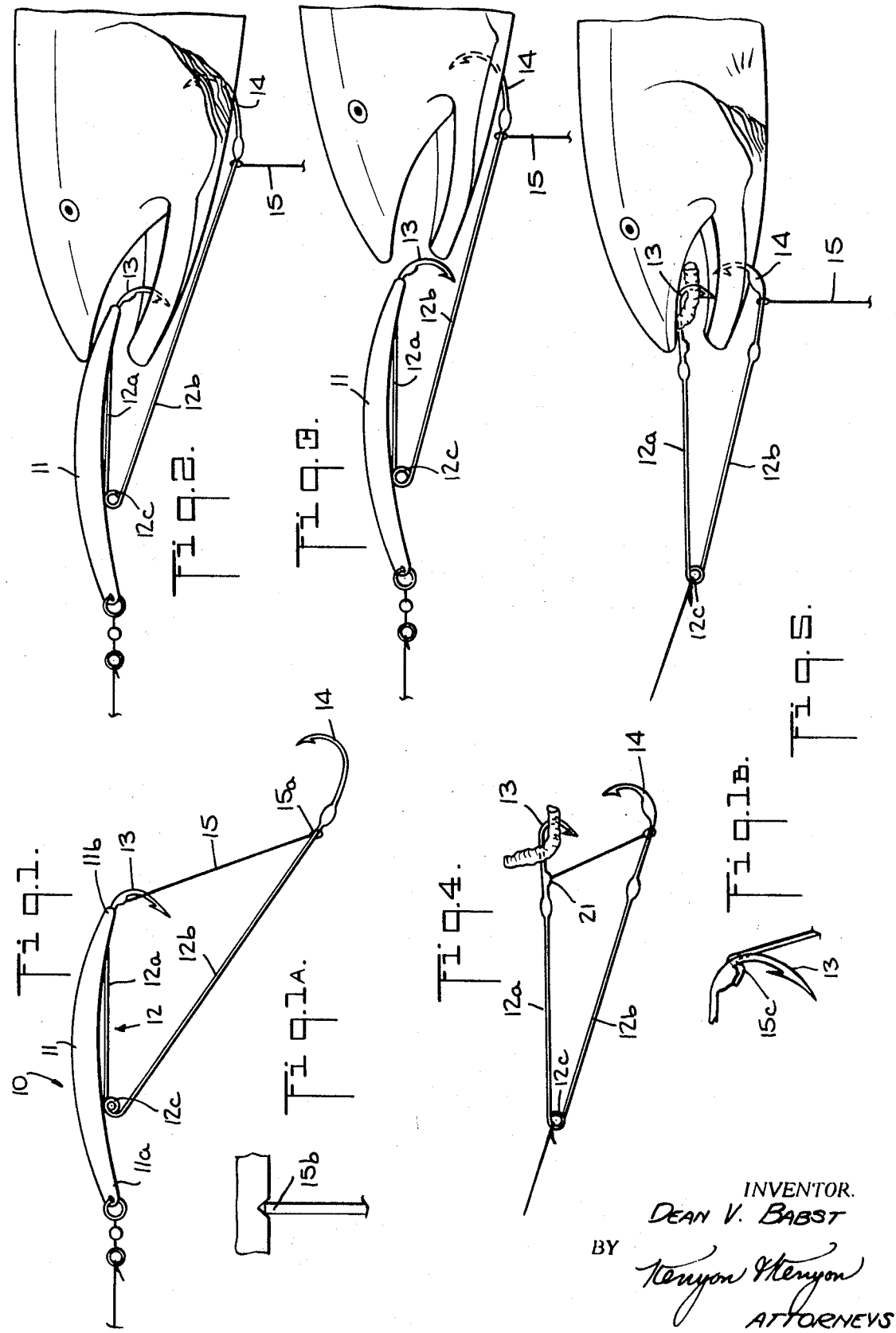

FISH-CATCHING APPARATUS WITH SNAP-ACTUATABLE HOOKS

This invention relates to fish-catching apparatus of the type utilizing a pair of snap-actuatable fish hooks to impale and catch a fish biting at the apparatus.

The sport of fishing has achieved great popularity and a number of different types of fish lures have been designed to improve the chances of catching a fish biting at the lure and preventing the fish so biting from escaping. One way recognized in the prior art to improve the chances of catching a fish biting at a lure was to utilize the force imparted to the lure by fish biting thereat to trigger two snap-actuatable hooks located on the lure to move in a direction to impale the fish. This technique will in principle maximize the chances of catching a fish biting at a lure but was used in prior art fish lures with limited success. One reason for the limited success of prior art fish lures utilizing this principle was that they were not designed to catch a fish biting short at the lure, i.e., where the bite of the fish only encompassed the trailing edge of the lure. Thus, with prior art fish lures of this type a fish biting short at the lure would release the trigger for the hooks on the lure so that the hooks would be moved in a direction toward each other. However, this would not impale the fish biting short at the lure since the hooks were designed to only impale and catch a fish biting normally at the lure and not short thereof.

Another drawback of prior art fish lures of the type described herein was that very often when using these fish lures, the trigger for the hooks would be released by seaweed or some other object in the water causing the hooks to be moved towards each other and in a position relative to each other which blocked access to the barbs on the hooks. This prevented a fish from being caught on either of the hooks on the lure when biting at the lure subsequent to when the hooks were moved toward each other as a result of the trigger of the lure being inadvertently released.

Another drawback in the design of some prior art fish lures of the kind described herein was that it was necessary for the fish to bite down hard on nearly the entire lure in order to release the trigger so the hooks would move to impale the fish biting thereat. With this type of lure it is quite obvious that a fish could take a quick bite at the lure without being caught since this quick bite would generally not provide sufficient striking force on the lure trigger to cause the hooks thereon to move to impale the fish.

A further drawback in the design of these prior art fish lures was that the lure hooks were designed so that when a fish bit at the lure and caused the hooks to be actuated they would pass out the sides of the mouth of the fish not catching the fish instead of entering the upper and lower portion of the mouth of the fish which would catch the fish. Similarly, some prior art fish lures of the type described herein were designed so that when a fish bit at the lure and caused the hooks to be actuated one of the hooks was directed against a part of the fish not easily penetratable, such as the bony part on the top of the fish's head, which minimized the chances of this hook successfully impaling the fish.

While I have discussed the drawbacks of prior art fish lures having snap-actuatable fish hooks it is to be appreciated that bait fishing devices having snap-actuatable fish hooks are known in the prior art. Generally, these devices had the same disadvantages as the prior art lures utilizing snap-actuatable fish hooks except that they are not faced with the problem of fish biting short since the bait devices are usually not pulled through the water which causes a fish to bite short at the moving device.

While of the above-discussed disadvantages was detrimental to the successful use of these prior art fish lures it is obvious that if a fish lure could be designed to overcome these disadvantages and be economical to make, it would find widespread use since a lure of this type would greatly increase the chances of catching a fish biting thereat. Similarly, it is obvious that if a bait fishing device with snap-actuatable fish hooks could be successfully designed it would find widespread use since it would increase the changes of catching fish biting at the bait.

It is therefore an object of the present invention to provide an improved fish-catching device of the type having two hooks that are snap actuatable to move in a direction to impale a fish biting at the device.

An additional object of the present invention is to provide a fish-catching lure of the type having snap-actuatable fish hooks that will impale a fish biting at the lure even if the fish should bite short at the lure.

Another object of the present invention is to provide a fish-catching device of the type having hooks that are snap actuatable upon a fish biting at the device to move in a direction which will impale the fish wherein when the hooks have been so moved at least one hook will be accessible so that a fish then biting at the device may be caught on the accessible hook.

A further object of the present invention is to provide a fish-catching device of the kind having a plurality of hooks that are snap actuatable upon a fish biting thereat to move in a direction to impale the fish wherein only a light force is required to be imparted to the device by the fish biting thereat to trigger movement of the hooks.

Briefly, in one embodiment of the present invention, the foregoing objects are accomplished by having two fish hooks located on a fish lure with spring means utilized to bias the hooks in a direction toward each other. One of the hooks extends past the trailing edge of the lure and past the other fish hook with a trigger bar locatable between the two fish hooks to maintain the hooks in a cocked position under the bias of the spring. When a fish bites at the lure and hits the trigger bar the bar will be removed from its position between the hooks with the spring means moving the hooks toward each other to impale the fish striking at the lure. By having one hook extend past the trailing edge of the lure this hook will be able, upon spring actuation, to impale a fish biting short at the lure. Additionally, by having one hook extend past the other hook the extended hook will be accessible, even after the hooks have been moved toward each other under the bias of the spring, to catch a fish biting at the lure subsequent to the release of the lure trigger.

A further embodiment of the present invention is designed to utilize the spring-actuated hooks discussed above in bait fishing.

Other objects, aspects an features of the present invention will become apparent from the following specification and drawings in which:

FIG. 1 is an illustration of a fish lure in accordance with the present invention;

FIGS. 1a and 1b are enlarged view of different triggering mechanisms suitable for the snap-actuatable fish hooks on the fish lure of FIG. 1;

FIG. 2 is an illustration of how the fish lure of FIG. 1 is sued to catch fish biting at the lure;

FIG. 3 is an illustration of how the fish lure of FIG. 1 may be used to catch a fish biting short at the lure;

FIG. 4 is an illustration of an embodiment of the present invention particularly suited for bait fishing; and FIG. 5 is an illustration of how the embodiment of the invention shown in FIG. 4 may be utilized to catch fish biting thereat.

Referring now to the drawings wherein common reference numerals denote common elements throughout and FIG. 1 in particular wherein a fish lure 10 in accordance with the present invention is seen to include a body portion 11 having a forward end 11a and a trailing edge 11b with fish line-attaching apparatus joined to forward end 11a thereof. Body portion 11 can be made of a material that will attract fish as it moves through the water and can be aerodynamically designed to gyrate in the water as it is moved therethrough to further attract fish.

Body portion 11 has attached thereto a spring mechanism 112 which comprises spring legs 12a and 12b and coil 12c located therebetween. Hooks 13 and 14 extend, respectively, from legs 12a and 12b with the barb of each hook pointing toward the other hook and toward forward end 11a of body portion 11. Spring leg 12a may be affixed to body portion 11 by any of the techniques available to the skilled mechanic. Leg 12b is substantiaLly longer than leg 12a with hook 14 located substantially past trailing edge 11b of lure 10 whereas hook 13 is located adjacent the trailing edge of the lure. A trigger bar 15 has a loop 15a which passes over spring leg 12b and an abutment end 15b (FIG. 1a) that is used to hold spring legs 12a and 12b and hooks 13 and 14 in the cocked position seen in FIG. 1. This is accomplished by having abutment end 15b located in an indent which is formed on a soldered portion of material on hook 13 near the barb thereof. If desired, a "V" 15c can be placed on the end of trigger bar 15 as seen in FIG. 1b to rest against the soldered material on hook 13 to hold the hooks in a cocked position. Preferably, trigger bar 15 is made from a very fine stiff wire as is known in the art. When abutment end 15b of trigger bar 15 is removed from the indent of lure 10 or "V" 15c is removed from resting on the soldered material as seen in FIG. 1b, spring legs 12a and 12b will move toward each other under the bias of of coil 12c as will hooks 13 and 14.

Normally, the spring legs and hooks will be in the cocked position seen in FIG. 1 with a fishing line pulling lure 10 through the water at normal trolling speeds. If a fish bites at the lure, it will strike trigger bar 15 removing the abutment end of the trigger bar from the indent in the soldered material, or if a "V" is used at the end of the trigger bar the "V" will no longer hold the hooks in the cocked position by the technique seen in FIG. 1b so that spring legs 12a and 12b and hooks 13 and 14 will move toward each other so hook 13 can impale the top of the lower jaw of the fish (FIG. 2) and hook 14 can impale the bottom of the lower jaw. Quite often a fish will bite at the lure and release trigger bar 15 even though it is biting short. Since the fish is biting short, hook 13 will not be able to impale the fish but lower hook 14 will impale the bottom jaw of the fish as seen in FIG. 3. Similarly, if the trigger bar should be actuated by seaweed or some other object causing spring legs 12a and 12b and hooks 13 and 14 to move toward each other, a fish striking at the lure could bite upon and be caught by hook 14. This is possible since hook 13 upon being moved toward hook 14 by release of the trigger mechanism does not block access to hook 14 since the latter hook extends substantially past the trailing edge of lure 10 whereas hook 13 does not. Also the fish could be caught if the trigger is released by biting at the lure with the result that as the fish bites at the lure, hook 14 will slide along the lower jaw of the fish and will impale the fish as it pulls back from the lure.

In FIG. 4, an embodiment of the present invention is seen that is particularly suited for use in bait fishing and includes a spring coil 12c to which a fishing line may be attached and to which spring legs 12a and 12b are attached. Since the embodiment of the invention disclosed in FIG. 4 is to be used in bait fishing wherein the hook is not retrieved as rapidly as with lure fishing, the problem of fish biting short is not serious and therefore leg 12b need not extend much further than leg 12a as is done in the embodiment shown in FIG. 1. In the embodiment of the invention seen in FIG. 4 the indent to receive the abutment end of trigger bar 15 is located on a soldered receptacle 21 formed on spring leg 12a. Of course, if desired, trigger bar 15 may have a "V" at one end to be braced against the soldered material on spring leg 12 so as to be able to hold the hooks in a cocked position.

Normally, hook 13 will be baited as shown in FIGS. 4 and 5 and any fish biting at the bait will strike trigger bar 15 releasing the trigger bar from holding the spring legs and hooks in the cocked position seen in FIG. 4 so that the hooks will impale the top and bottom of the lower jaw of the fish as seen in FIG. 5.

With the embodiment shown in FIG. 4, it is very difficult for the fish to nibble at the hook without striking the trigger bar and causing the hooks to be moved adjacent each other to impale the fish. This will, to a great extent, prevent fish from nibbling at the bait and escape being caught. The hooks will normally be slightly apart from each other after having been spring moved toward each other with access to the hooks so that if seaweed or some other object should knock the trigger bar aside, the fish may still strike at the bait and be caught. In using this embodiment of the present invention a weight may be attached to spring leg 12b to hold this leg beneath leg 12a. While I have shown the embodiments of FIGS. 4 and 5 with fishing line for trolling it is obvious that this embodiment may be used by merely being dropped in the water.

A feature of both embodiments of the present invention that deserves special attention is the ease with which a fish biting at the lure or bait may release the trigger bar. This is possible because the abutment end of trigger 15 is lightly held in its receiving indent and a small force transmitted to the trigger bar will cause the abutment end to move from its indent. This is similarly true for the "V" 15c of the end of the trigger bar which can be easily displaced from the soldered material against which it rests when holding the hooks in a cocked position. This means that a fish merely nibbling at the bait on the embodiment of FIG. 5 or lure of FIG. 1 can release the trigger bar and be caught, decreasing the chances of a fisherman experiencing fish bites without the fish being caught.

I claim:

1. Fish-catching apparatus comprising:
    a. a mechanism including a first leg with a fish hook extending from one end thereof, a second leg with a fish hook extending from one end thereof, said legs being connected to each other at their other ends and disposed in divergent relationship, said hooks being disposed to face toward each other, said first leg being substantially longer than said second leg, and said mechanism also including means to bias said legs toward each other, and
    b. means for selectively holding said legs and hooks extending therefrom apart from each other against said biasing means, said means including a trigger fixed relative to one leg and releasably fixable relative to the other leg whereby when a fish bites at the apparatus the fish will strike said trigger moving said trigger from between said legs to allow said legs and said hooks extending therefrom to move toward each other under said biasing means so the fish biting at the apparatus will be caught on at least one of said hooks.

2. Fish-catching apparatus according to claim 1 further including a fish lure having a body portion with said second leg attached thereto.

3. Fish-catching apparatus according to claim 1 wherein said trigger is a rigid member having two ends and is pivotably attached to said first leg at a first end with said other end receivable in an indent formed adjacent said hook of said second leg.

4. Fish-catching apparatus according to claim 1 wherein said trigger is a rigid member having two ends and is pivotably attached to one of said legs at one end with said other end receivable in an indent formed in said other leg.

5. Fish-catching apparatus according to claim 1 wherein said trigger is a rigid member having a loop formed at one end and means on said first leg adjacent said first leg hook against which said loop may be braced to hold said legs apart from each other.